May 2, 1961 R. L. BERRY 2,982,913
TEST SETS
Filed April 4, 1958 2 Sheets-Sheet 2
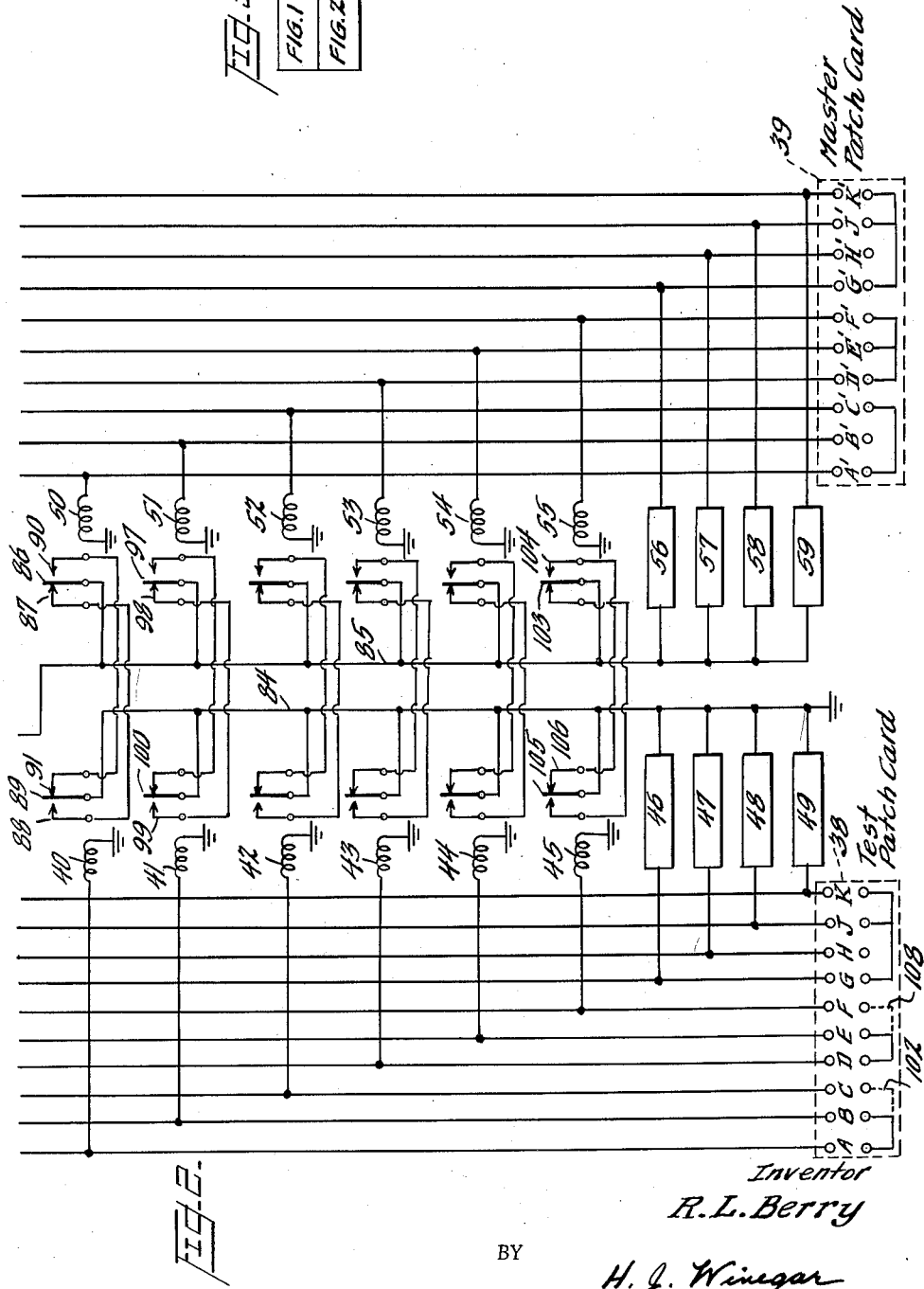

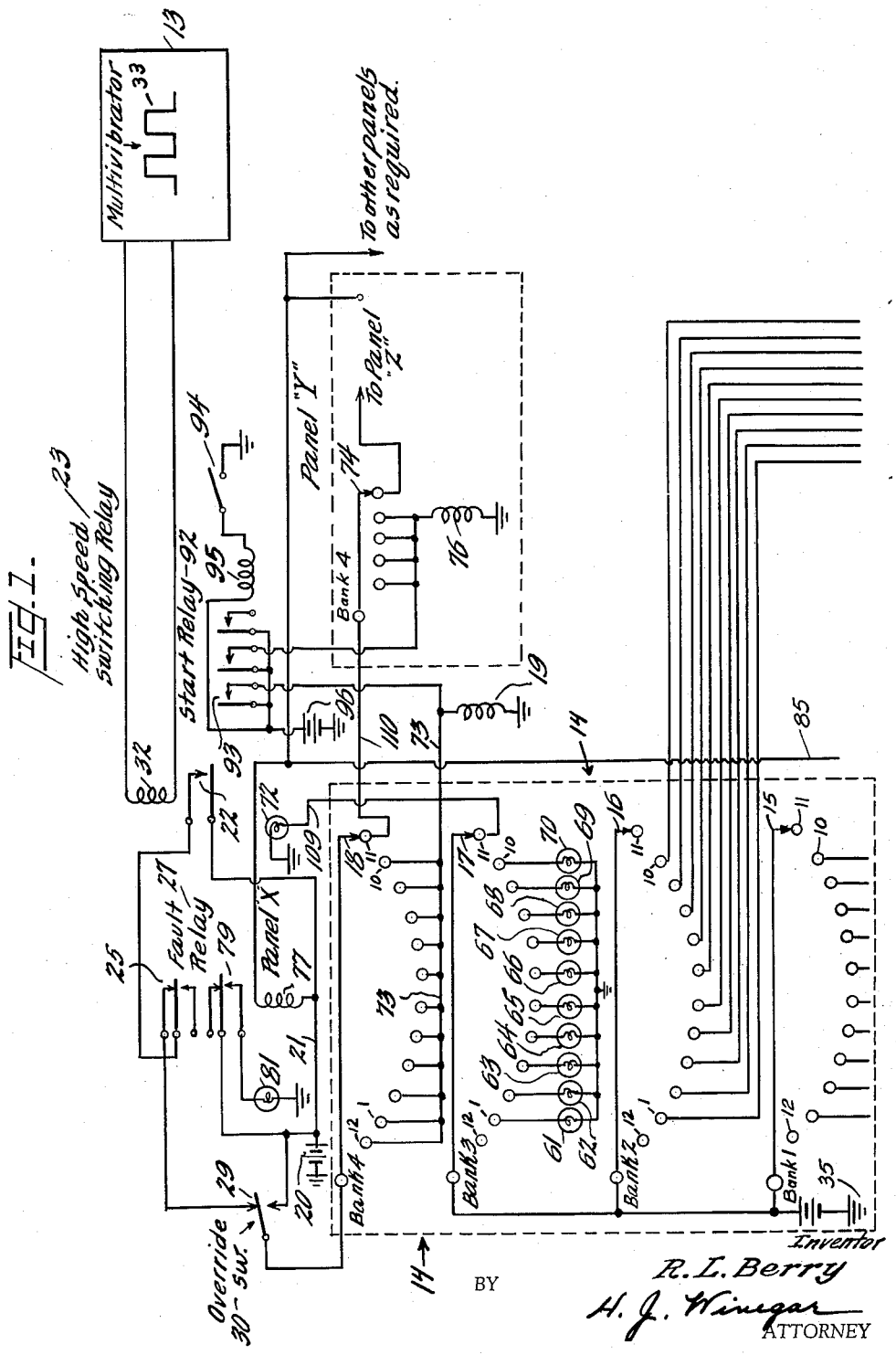

United States Patent Office 2,982,913
Patented May 2, 1961

2,982,913
TEST SETS
Richard L. Berry, Burlington, N.C., assignor to Western Electric Company, Incorporated, New York, N.Y., a corporation of New York
Filed Apr. 4, 1958, Ser. No. 726,368
9 Claims. (Cl. 324—73)

This invention relates to test sets and more particularly to a test set for testing the conformity of connections between terminals of a multiterminal test patch card with connections between terminals of a multiterminal master patch card.

Patch cards are well known as a convenient and expeditious means of making temporary cross connections between two or more electrical terminals. The larger the number of terminals on the patch card, the greater its utility. However, the larger the number of terminals, the larger the number of errors possible in making the cross connections between the terminals. For example, in a typical patch card having 396 contacts mounted and mutually insulated, if only one wire were used to connect any two contacts on the patch card, the theory of combinations reveals that there are 78,210 possible different connections. Consideration of the possibilities of different combinations of connections when more than one wire is used reveals a total of over six billion possible combinations. It is therefore most desirable to have a test set which is capable of quickly testing the connections of patch cards, especially when a variety of connections are required for various operations.

An object of this invention is to provide a new and improved test set.

Another object of this invention is to provide a test set capable of quickly testing the connections between the terminals of a patch card.

Apparatus illustrating certain features of the invention may include a pair of relays for each pair of corresponding terminals of the test network and the master network, one relay of each pair of relays being connected to a terminal of a test network and the other relay of the pair of relays being connected to the corresponding terminal on a master network, a source of relay energizing potential, means for connecting the source of relay energizing potential directly to a selected pair of corresponding terminals of the test network and the master network so that the pair of relays associated with the selected pair of terminals are energized as are any other relays connected indirectly with the selected pair through connections on the test network and the master network, and fault detecting means operatively connected to the pairs of relays so that when only one relay of any pair of relays is operated the fault detecting means is operated to indicate a non-conformity.

A more complete understanding may be had from a detailed description of a specific embodiment of the invention, when read in conjunction with the appended drawings, in which:

Figs. 1 and 2 taken jointly and arranged as shown in Fig. 3 comprise a schematic diagram of a system forming the specific embodiment of the invention.

In the preferred embodiment, the test set is composed of a plurality of panels, designated panel X, panel Y, and panel Z in Fig. 1, which are housed in a cabinet (not shown) with suitable indicators mounted on the front of the panels to indicate the progress or results of the testing operation. Each panel is provided with equipment to test a predetermined number of patch card terminals. The panels operate in sequence and there is a central power source 13 which is designed to be switched from one panel to the next succeeding panel upon successful completion of the testing operation of the first panel. For purposes of simplicity of explanation, the circuitry and operation of a single panel, panel X, will be described. It is to be understood that the circuitry and operation of the other panels are substantially identical.

Referring now to the drawings, and more particularly to Fig. 1, there is shown a schematic representation of a conventional, electromagnetically operated stepping switch indicated generally by the numeral 14. The stepping switch includes four selector switch banks indicated on Fig. 1 as bank No. 1, bank No. 2, bank No. 3, and bank No. 4 and a rotatable shaft (not shown) having wipers 15, 16, 17, and 18, respectively, mounted thereon. Each wiper is mounted on the rotatable shaft so as to be able to engage the contacts 1 through 12, inclusive, of the switch banks, the contacts being arranged in semicircular fashion. Upon the engagement of a wiper with a contact of a switch bank, an electrical connection is made. The selector switch 14 is of a conventional type in which the shaft automatically rotates to advance the wipers associated with each bank simultaneously step-by-step upon successive energization of its operating coil 19.

The operating coil 19 is energized by a source of potential 20. The energization circuit path from the source of potential 20 to the operating coil 19 extends over a line 21 through the normally open contacts 22 of a high-speed switching relay 23, the normally closed contacts 25 of a fault relay 27, the normally closed contacts 29 of an override switch 30, the wiper 18, and then through a terminal of switch bank 4 which is in engagement with the wiper 18. The above traced energization circuit is intermittently interrupted upon the successive opening and closing of the normally open contacts 22 of the high-speed switching relay 23.

The high-speed switching relay 23 has an operating coil 32 which is energized by the power source 13. The power source 13 includes a multivibrator (not shown) which generates an unsymmetrical wave form 33. The wave form 33 is 28 volts in amplitude, has a positive pulse width of 30 milliseconds and a negative pulse width of 20 milliseconds, thereby having a pulse rate of 20 pulses per second. Thus a positive pulse from the multivibrator actuates the high-speed switching relay 23. Actuation of the high-speed switching relay closes the normally open contacts 22 thereby completing the energization path from the source of potential 20 to the operating coil 19. Energization of the operating coil 19 actuates the stepping relay 14 which in turn steps the wipers 15 to 18, inclusive, from one contact to another of the switch banks 1 through 4.

The electromagnetic stepping switch 14, utilized in the present embodiment, comprises four switch banks with each bank or level, as they are sometimes referred to in the art, having twelve contacts. Each contact, when in engagement with its associated wiper, comprises a switching bank position. It is manifest that the switch banks could have any number of contacts depending upon the number of patch card terminals to be tested. Wipers 15 to 17, inclusive, of the stepping switch 14 are connected to a source of potential 35. Thus, the wipers 15 to 17, inclusive, apply a potential to the contacts of banks 1 through 3 as they step from contact 1 through 11.

Detachably connected to each of the contacts 1 through 10 of bank 1 of the stepping switch 14 are terminals A to K, inclusive, of a test patch card 38. Also connected to each of the contacts of bank 1 is the operating coil of a single-pole, double-throw relay 40 to 49, inclusive. Each single-pole, double-throw relay 40 to 49, inclusive, has a front contact, a movable contact, and a back contact. In the inoperative position, the movable contact of each relay is closed on the front contact and upon actuation of the relay the movable contact closes on the back contact.

The contacts of bank 2 of the stepping switch 14 are wired to terminals A′ to K′ inclusive of master patch card 39 and to the operating coil of relays 50 to 59, inclusive. Contact 1 of bank 1 is connected to terminal A of the test patch card 38 and contact 1 of bank 2 is connected to terminal A′ of the master patch card 39. This relationship exists between all the contacts 1 to 10, inclusive, of banks 1 and 2.

Connected between each of the contacts 1 to 10, inclusive, of switch bank 3 and ground, are indicating lamps 61 to 70, inclusive. Therefore, when the voltage carrying wipers 15 to 18, inclusive, are connected to contact 1 of each switch bank, indicating lamp 61 will be illuminated. As the wipers step from contacts 1 through 10, each indicating lamp 61 through 70 will be successively illuminated. Therefore, should the testing operation be stopped for any reason, an indicating lamp will be illuminated thereby indicating upon which contact of the switch banks the wipers 15 through 18 have stopped. Terminal 11 of bank 3 is connected to a test complete lamp 72 which is illuminated upon the successful completion of the testing by panel X.

The terminals of switch bank 4 of panel X, with the exception of terminal 11, are connected to a common line 73 and to the operating coil 19 of the stepping switch 14. Terminal 11 of bank 4 of panel X is connected to a wiper 74 of bank 4 of panel Y. Therefore upon successful completion of the testing of the test patch card terminals, A through K, connected to panel X, the source of potential 20 is transferred to the wiper 74 associated with bank 4 of panel Y thereby energizing a stepping switch operating coil 76 of panel Y. Panel Y then begins its testing operation and upon completion thereof, transfers the source of potential 20 to the succeeding panel Z in the manner set forth above.

The fault relay 27 includes an operating coil 77, a pair of normally open contacts 79, and the pair of normally closed contacts 25. One end of the operating coil 77 is connected to the source of potential 20 and the other end of the operating coil is connected to a line 85 which is common to the movable contacts of relays 50 through 59. The normally open contacts 79 furnish, upon closure, that is, actuation of the fault relay 27, an energization path for a fault lamp 81. The normally closed contacts 25, as mentioned above, are in the energization path of the operating coil 19. Thus upon actuation of the fault relay 27, contacts 25 are opened to deenergize the operating coil 19.

In the testing operation, the relays 40 to 49, inclusive, and 50 to 59, inclusive, work in associated pairs. For example, the contacts of the relay 40, which is connected to terminal A of the test patch card 38, are interconnected with the contacts of the relay 50, which is connected to terminal A′ of the master patch card 39. Hence, the pairs of relays which are connected to corresponding terminals of the master and test patch cards are designated as associated pairs of relays. The contacts of the relays 40 through 49 and the contacts of the relays 50 through 59 are interconnected in a unique manner. The front contact of each relay of a pair of associated relays is connected to the back contact of its associated relay.

Relays 40 through 49, which are connected to the terminals A through K of the test patch card 38, have their movable contacts connected to a common line 84, which is at ground potential. Relays 50 through 59, which are connected to the terminals A′ through K′ of the master patch card 39, have their movable contacts connected to a common line 85. Line 85 is connected in series with the operating coil 77 of the fault relay 27 and is at the potential of the battery 20.

It is manifest that the operating coil 77 of the fault relay 27 will be energized over the line 85 should a path be made between the line 85, which is at battery potential, and the line 84, which is at ground potential. It may be seen from the above-described interconnection between the contacts of each pair of associated relays that a path will be established between the line 84 and line 85, should only one relay of any pair of associated relays be actuated. By way of example, should relay 40 of associated pairs of relays 40 and 50 be actuated while relay 50 is unactuated, an energization path for the operating coil 77 of fault relay 27 will be established to ground over the line 85 through the movable contact 86 and front contact 87 of relay 50 and the back contact 88 and movable contact 89 of relay 40 to the line 84. Conversely, it is obvious that should relay 50 be actuated while its associated relay 40 is unactuated, a path between line 85 and line 84 would be established over the movable contact 86 and back contact 90 of relay 50 and the front contact 91 and movable contact 89 of relay 40. Further inspection of the interconnection of the contacts of the pair of associated relays 40 and 50 reveals that if both relays are actuated simultaneously, or if both relays are simultaneously inoperative, there is no path between line 84 and line 85.

*Operation*

A complete understanding may be had of the test set by following through a complete sequence of operation. Preparatory to starting the test, the master patch card 39 corresponding to the wiring to be tested on the test patch card 38, is connected into the test set. Should a number of different wiring connections be used repeatedly, it may be advantageous to have a number of different master patch cards pre-wired. The master patch card corresponding to the wiring to be tested can be readily connected into the test set by any suitable means, such as a universal plug. Thus the test set may be quickly adapted to perform a number of different testing operations. The test patch card 38 is suitably connected into the test set. After having completed a previous test the stepping switch of each panel is stopped on position 11 and each test complete lamp 72 is illuminated.

The start relay 92 is provided with a pair of normally open contacts, for example contact 93, for each panel of the test set. Start switch 94 is closed momentarily to energize an operating coil 95 of the start relay 92. Actuation of the start relay 92 momentarily connects the operating coil of each stepping switch across a source of potential 96. The stepping switches advance simultaneously from position 11 to position 12 upon the release of the start switch 94 whereupon the test complete lamp of each panel is extinguished.

The description of the testing operation will now be restricted to panel X, with the understanding that the other panels will operate sequentially in the same manner. When the selector switch 14 advances to position 12, interrupted energizing voltage from the source of potential 20 is connected to the operating coil 19 over the wiper 18 which is in engagement with the contact 12 of bank 4 at position 12.

The stepping switch 14 then advances to position 1. Wipers 15, 16, and 17, being connected in parallel to the battery 35, apply potential to the contacts of banks 1 through 3. The potential applied to bank 3 illuminates the lamp 61. Wiper 15 applies voltage to contact 1 of bank 1 thereby energizing relay 40, and due to the connection between terminals A and B on the test patch card 38, relay 41 is also energized. Wiper 16 simultaneously applies voltage to the contact 1 of bank 2 whereupon relays 50 and 52, associated with terminals A′ and C′ of the master patch card 39, are energized.

It is to be noted that relays 40 and 50 are being energized directly from the voltage 35 as they are connected directly to the switch bank contacts that are in engagement with the voltage carrying wipers 15 and 16. Relays 41 and 52 are energized indirectly since these relays are connected to the voltage source 35 through the connection between the terminals of the test network and the master network.

Since the relays associated with the same terminals on the test patch card 38 and the master patch card 39 work in associated pairs, the interconnections between the contacts of associated pairs of relays will now be examined to determine if a path to ground has been established between the line 85 and the line 84. Since both relays of associated pairs of relays 40 and 50 are actuated, there is no path to ground through the interconnection of their contacts. However, since relay 41 is operated while its associated relay 51 is not operated, a path to ground will be established from line 85 to ground over the movable contact 97 and front contact 98 of relay 51 and the back contact 99 and movable contact 100 of relay 41. In like manner, a path will also be established to ground over the interconnection between the contacts of relays 42 and 52.

Establishment of the path to ground furnishes an energizing path for the operating coil 77 of the fault relay 27. Actuation of the fault relay 27 opens the normally closed pair of contacts 25 thereby breaking the circuit path of the energization voltage for the operating coil 19 of the stepping switch 14. Thus the testing operation is stopped and lamp 61 of bank 3 remains illuminated thereby indicating a non-conformity between the wiring of the test patch card 38 and the master patch card 39. An operator is then apprised of the non-conformity and a check of the wiring associated with terminal A of the test patch card 38 will reveal that an erroneous connection has been made between terminals A and B of the test patch card. A proper connection may then be made between terminals A and C of the test patch card, as is indicated by the dashed line 102.

Having made the correction on the test patch card 38, the operator then depresses the override switch 30 which temporarily connects the operating coil 19 to the source of energizing potential 20 over the contact 29 of the override switch and the wiper 18 of bank 4. The stepping switch 14 then advances to position 2. Wipers 15 and 16 apply voltage to contact 2 of banks 1 and 2, thereby energizing associated pair of relays 41 and 51. Since there are at this time no connections to terminals B of the test patch card 38 and the master patch card 39, only relays 41 and 42 are energized. Since both relays 41 and 42 are energized, there is no path to ground established between lines 84 and 85. Thus upon the next pulse of the interrupted energizing voltage, the stepping switch 14 automatically steps to position 3. At position 3 wipers 15 and 16 apply voltage to contacts 3 of banks 1 and 2. Associated pairs of relays 42 and 52 are energized and due to the connection between terminals C' and A' of the master patch card 39 and terminals C and A of the test patch card 38, associated pair of relays 40 and 50 are also energized. Again no path to ground is established between the lines 84 and 85 as both relays of each pair of associated relays are actuated.

Upon the next pulse of energizing voltage the stepping switch 14 automatically steps to position 4. Wipers 15 and 16 apply voltage to the switch bank contacts of banks 1 and 2 at position 4 thereby energizing associated pair of relays 43 and 53. Due to the connections between terminals D and E of the test patch card 38, relay 44 is also energized. Through interconnection of the terminals D', E', and F' on the master patch card 39, relays 54 and 55 are also energized. At this time both relays of associated pairs of relays 43 and 53 and 44 and 54 are actuated. Thus no path to ground is established through their relay contacts. However, only relay 55 of associated pair of relays 45 and 55 is actuated. Thus a path to ground between lines 85 and 84 is established over the movable contact 103 and the back contact 104 of relay 55 and the movable contact 105 and front contact 106 of relay 45. This path to ground furnishes an energization path for the fault relay 27, which when actuated opens its normally closed contacts 25 thereby breaking the energization path to the operating coil 19.

The stepping switch 14 then stops on position 4 and its stopped position is indicated by the illuminated lamp 64. The operator may then check the wiring associated with terminal D on the test patch card and correct the non-conformity as indicated by the dashed line 108 or instead of immediately making the connection, the operator may depress the override switch 30 thereby advancing the stepping switch 14 to position 5. The stepping switch 14 is again stopped as before due to the unbalance between associated pair of relays 45 and 55. Again by depressing the override switch 30 the operator may advance the stepping switch 14 to position 6 where the stepping switch is stopped once more due to the unbalance between the associated pair of relays 45 and 55. A subsequent depression of the override switch 30 will advance the stepping switch 14 from position 6 to position 7 and since the wiring between terminals G, H, J, and K on the test patch card 38 conforms to the wiring between the same terminals of the master patch card 39, the stepping switch will then automatically step from position 7 through position 11.

At position 11 wiper 17 applies voltage over the line 109 to illuminate the test complete lamp 72. Wiper 18 transfers the interrupted energizing voltage over the line 110 to the drive coil 76 of panel Y. Panel Y then functions to perform similar test operations as performed by panel X.

Since the stepping switch stopped on switch bank positions 4, 5, and 6 before it transferred the test operation to panel Y, the operator then is aware that a discrepancy exists between the wiring of terminals D, E, and F of the test patch card 38 and the wiring between the same terminals of the master patch card 39. Knowing where the non-conformity is located, the operator may then quickly check the wiring between terminals D, E, and F of the test patch card and will then place the connection indicated by the dashed line 108. Thus it is seen that the present test set not only gives an indication of a non-conformity when a connection has been improperly placed between the terminals of a patch card, but will also give an indication of non-conformity when a connection has been omitted.

In a typical embodiment of the present test set, consisting of 20 panels with the switch bank of each panel having 22 contacts, facilities are provided to check the connections between 400 terminals of a typical patch card. A typical test patch card having 396 contacts was tested by the present embodiment. If only one wire were used to connect any two contacts on the typical test patch card, the theory of combinations yields a figure of 78,210 as the number of different possible combinations. When the possibility of an omitted connection is considered, the figure is doubled and the number of possible combinations is then 156,420. The present test set was utilized to check the connections of the typical test patch card and it performed 156,422 checks for continuity and discontinuity in approximately 20 seconds. Thus the great utility and desirability of the present invention are readily seen by the above testing operation.

The test set has a self-checking feature since by operating the test set with neither the test patch card 38 nor the master patch card 39 connected, the operation of each pair of associated relays is checked. As the stepping switch 14 automatically steps from position 1 to position 10, with wipers 15 and 16 applying potential to the contacts of banks 1 and 2, each pair of associated relays will be energized in sequence. Should the fault relay 27 be energized at any position, it would indicate that one relay of the pair of relays, connected to the position on which the test set stops, is failing to operate.

The operation of the fault relay 27 can be checked by operating the test set with only the master patch card 39 connected. The fault relay 27, if it is operating properly, will be actuated at each stepping switch position that is connected to a terminal which is connected to another terminal by a cross section on the master patch card 39. For example, with only the master patch card 39 connected at position 1, relays 50 and 52 will be energized. Since only relay 50 of the associated pair of relays 40 and 50 will be actuated, the fault relay 27 will be provided an energization path to ground over the movable contact 87 and the back contact 90 of relay 50 and the movable contact 89 and front contact 91 of relay 40. Another path would of course be established in a similar manner over the contacts of associated pair of relays 42 and 52.

It is manifest that the above invention has applications in other than the testing of patch cards. The invention can be readily adapted to test connections between the electrical contacts of any network, such as the connections between electrical contacts of an amplifier, computer, or other electrical systems. Thus the term "network" has the connotation of any system having electrical contacts with connections therebetween.

What is claimed is:

1. A test set for testing the conformity of connections between terminals of a multiterminal test network with connections between corresponding terminals of a master network, which comprises a plurality of pairs of relays, means for connecting a first relay of each pair of relays to a terminal of the test network, means for connecting a second relay of each pair of relays to the corresponding terminal on the master network, a source of relay energizing potential, selective means for connecting the source of relay energizing potential to corresponding pairs of terminals of the test network and the master network to sequentially operate the relays associated with said terminals and the relays associated with other terminals that are connected to said terminals and fault detecting means energized by the operation of only one relay of any pair of relays for indicating non-conformity.

2. A test set for testing the conformity of connections between terminals of a multiterminal test network with connections between corresponding terminals of a master network, which comprises switching means, a plurality of pairs of relays, means for connecting a first relay of each pair of relays to a terminal of the test network and to the switching means, means for connecting a second relay of each pair of relays to the corresponding terminal on the master network and to the switching means, a source of relay energizing potential, means for operating the switching means to apply the relay energizing potential to corresponding pairs of terminals of the test network and the master network to sequentially operate the relays associated with said terminals and the relays associated with other terminals that are connected to said terminals, and a fault detection device energized by the operation of only one relay of any pair of relays for indicating non-conformity.

3. A test set for testing the conformity of connections between terminals of a multiterminal network with the connections between corresponding terminals of a master network, which comprises switching means, a source of relay energizing potential, a plurality of pairs of relays, means for connecting a first relay of each pair of relays to a terminal of the test network and to the switching means, means for connecting a second relay of each pair of relays to the corresponding terminal on the master network and to the switching means, means for actuating the switching means to connect the source of relay energizing potential to corresponding pairs of terminals of the test network and the master network to sequentially operate the relays associated with said terminals and the relays associated with other terminals that are connected to said terminals, and a fault detecting means energized by the operation of only one relay of any pair of relays for actuating a fault indicator to display non-conformity.

4. A test set for testing the conformity of connections between terminals of a multiterminal test network with the connections between corresponding terminals of a master network, which comprises a fault detecting device including an operating coil, a pair of normally closed contacts, a pair of normally open contacts and a fault indicator; a plurality of pairs of single-pole, double-throw relays having a front contact, a movable contact and a back contact; means for connecting a first relay of each pair of relays to a terminal of the test network; means for connecting a second relay of each pair of relays to a corresponding terminal on the master network; means for connecting the front contact of first relay to the back contact of the second relay; means for connecting the back contact of the first relay to the front contact of the second relay; means for connecting the movable contact of the first relay to ground; means for connecting the movable contact of the second relay to the operating coil of the fault detecting device; a source of relay energizing potential; a stepping switch connected to the terminals of the test network and master network and to the relays; means for operating the stepping switch to sequentially apply the relay energizing potential to corresponding pairs of terminals of the test network and the master network to select one pair of corresponding terminals and operate the relays associated with the selected pair of corresponding terminals and the relays associated with other terminals that are connected to said selected pair of corresponding terminals; means for energizing the operating coil of the fault detecting device when only one relay of any pair of relays is energized to close the normally open contacts of the fault detecting device to actuate the fault indicator and to open the normally closed contacts of the fault detecting device to remove the means for operating the stepping switch therefrom to halt the testing operation and indicate a non-conformity between the connections of the master network and the connections of the test network.

5. A test set for testing the conformity of connections between terminals of a multiterminal test network with connections between corresponding terminals of a master network which comprises a source of energizing voltage; a fault detection device including an operating coil, a pair of normally closed contacts, a pair of normally open contacts, and a fault indicator; means for actuating the fault indicator upon closure of said normally open contacts; a pair of single-pole, double-throw relays having an operating coil, a front contact, a movable contact, and a back contact; means for connecting one end of an operating coil of a first relay of each pair of relays to ground and for connecting the other end of the operating coil to a terminal on the master network; means for connecting one end of an operating coil of a second relay of each pair of relays to ground and for connecting the other end to the corresponding terminal on the test network; means for connecting the front contact of the first relay to the back contact of the second relay; means for connecting the back contact of the first relay to the front contact of the second relay; means for connecting the movable contact of the first relay to ground; means for connecting the movable contact of the second relay in series with the operating coil of the fault detection device and the source of energizing voltage; means to interrupt the source of energizing voltage to produce an interrupted voltage; a source of relay energizing voltage; an electromagnetically operated stepping switch having an operating coil and a plurality of switch banks, each switch bank having a plurality of contacts and an associated wiper; means for connecting the operating coil of said stepping switch to the source of interrupted energizing voltage through one of said switch banks and through the pair of normally closed contacts of said fault detection device; a plurality of second indicators connected to a second switch bank to indicate the progress of the testing; means for connecting a third switch bank to the terminals of one of the networks; means for connecting a fourth switch bank to the terminals of the other network; means for connecting the wipers of all the switch banks except said first-mentioned switch bank in parallel and to the source of relay energizing potential whereby said stepping switch upon energization of its operating coil applies the relay energizing potential to corresponding pairs of terminals of the test network and the master network to select one pair of corresponding terminals and operate the relays associated with the selected pair of corresponding terminals and the relays associated with other terminals that are connected to said selected pair of corresponding terminals; means for closing the normally open contacts and opening the normally closed contacts of the fault detection device when only one relay of any pair of associated relays is energized to actuate said fault indicator and to remove the interrupted voltage from the stepping switch thereby halting the testing and indicating a non-conformity between the connections of the terminals of the master network and the connections of the terminals of the test network and leaving of one of said second indicators actuated to indicate a non-conformity between the connections of the test network and the connections of the master network.

6. A test set for testing the conformity of connections between terminals of a multiterminal test network with connections between corresponding terminals of a master network which comprises a source of energizing voltage; a fault detection device including an operating coil, a pair of normally closed contacts, a pair of normally open contacts and a fault indicator; means for connecting the fault indicator in series with said energizing voltage and ground upon closure of said normally open contacts; a pair of single-pole, double-throw relays having an operating coil, a front contact, a movable contact, and a back contact; means for connecting one end of an operating coil of a first relay of each pair relays to ground and for connecting the other end of the operating coil to a terminal on the master network; means for connecting one end of an operating coil of a second relay of each pair of relays to ground and for connecting the other end to the corresponding terminal on the test network; means for connecting the front contact of the first relay to the back contact of the second relay; means for connecting the back contact of the first relay to the front contact of the second relay; means for connecting the movable contact of the first relay to ground; means for connecting the movable contact of second relay in series with the operating coil of the fault detection device and the source of energizing voltage; means to interrupt the source of energizing voltage to produce an interrupted voltage; a source of relay energizing voltage; an electromagnetically operated stepping switch having an operating coil and four switch banks which have a plurality of contacts and an associated wiper; means for connecting the operating coil of said stepping switch to the source of interrupted energizing voltage through the wiper and over the contacts of a first switch bank and through the pair of normally closed contacts of said fault detection device; a plurality of second indicators; means for connecting each second indicator between a contact of a second switch bank and ground whereupon as the wipers step sequentially across the contacts of said switch banks voltage from said relay energizing voltage is applied through the wiper and a contact of said second switch bank to actuate one of said second indicators to indicate the progress of the testing; means for connecting the contacts of a third switch bank to the terminals of one of the networks; means for connecting the contacts of a fourth switch bank to the terminals of the other network; means for connecting the wipers of the second, third, and fourth switch banks in parallel and to the source of relay energizing potential whereby said stepping switch upon energization of its operating coil applies the relay energizing potential over the wipers and contacts of said third and fourth switch banks to corresponding pairs of terminals of the test network and the master network to select one pair of corresponding terminals and operate the relays associated with the selected pair of corresponding terminals and the relays associated with other terminals that are connected to said selected pair of corresponding terminals; means for closing the normally open contacts and opening the normally closed contacts of the fault detection device when only one relay of any pair of relays is energized to actuate said fault indicator and to remove the interrupted voltage from the stepping switch thereby halting the test and indicating a non-conformity between the connections of the terminals of the master network and the connections of the terminals of the test network and leaving one of said second indicators actuated to indicate that a particular terminal of the test network has connections that are not in conformity with the connections of the master network.

7. A test set for testing the conformity of connections between terminals of a multiterminal test network with connections between corresponding terminals of a master network which comprises a source of energizing voltage; a fault detection device including an operating coil, a pair of normally closed contacts, a pair of normally open contacts, and a fault indicator; means for connecting the fault indicator in series with said energizing voltage and ground upon closure of said normally open contacts; a plurality of pairs of single-pole, double-throw relays having an operating coil, a front contact, a movable contact and a back contact; means for connecting one end of an operating coil of a first relay of each pair of relays to ground and for connecting the other end of the operating coil to a terminal on the master network; means for connecting one end of an operating coil of a second relay of each pair of relays to ground and for connecting the other end to the corresponding terminal on the test network; means for connecting the front contact of the first relay to the back contact of the second relay; means for connecting the back contact of the first relay to the front contact of the second relay; means for connecting the movable contact of the first relay to ground; means for connecting the movable contact of the second relay in series with the operating coil of the fault detection device and the source of energizing voltage; means to interrupt the source of energizing voltage to produce an interrupted voltage; a source of relay energizing voltage; a high-speed electromagnetically operated stepping switch having an operating coil and four switch banks which have a plurality of contacts and an associated wiper, each of said contacts when in electrical engagement with said associated wiper comprising a switch bank position; means for connecting the operating coil of said stepping switch to the source of interrupted energizing voltage through the wiper and over the contacts of a first switch bank and through the pair of normally closed contacts of said fault detection device; a plurality of second indicators connected between a contact of a second switch bank and ground whereupon as the wipers step sequentially across the contacts of said switch banks voltage from said relay energizing voltage is applied through the wiper and a contact of said second switch bank to actuate one of said second indicators to indicate the progress of the testing, means for connecting the contacts of a third switch bank to the terminals of one of the networks; means for connecting the contacts of a fourth switch bank to the terminals of the other network; means for connecting the wipers of the second, third, and fourth switch banks in parallel and to the source of relay energizing potential whereby said stepping switch upon energization of its operating coil applies the relay energizing potential over the wipers and contacts of said third and fourth switch banks to corresponding pairs of terminals of the test network and the master network to select one pair of corresponding terminals and operate the relays associated with the selected pair of corresponding terminals and the relays associated with other terminals that are connected to said selected pair of corresponding terminals; means for closing the normally open contacts and opening the normally closed contacts of the fault detection device when only one relay of any pair of relays is energized to actuate said fault indicator and to remove the interrupted voltage from the stepping switch thereby halting the testing and indicating a non-conformity between the connections of the terminals of the master network and the connections of the terminals of the test network and leaving one of said second indicators actuated to indicate that the switch bank position on which the stepping switch has stopped is connected to a terminal of the test network that is not connected in conformity with the corresponding terminal on the master network; an override switch for reenergizing the operating coil of the stepping switch whereby the testing operation is continued; a third indicator to display the completion of the testing; and means for actuating the third indicator through the wiper and a contact of said second switch bank.

8. A conformity test set which comprises a first relay connected to a first terminal of a test network, a second relay connected to a corresponding first terminal of a standard network, a source of relay energizing potential, means for connecting the source of potential to a second terminal which is connected to the first terminal of the test network and to a second terminal which is connected to the first terminal of the standard network to operate the relays, and fault detecting means energized by the operation of only one of the relays to indicate non-conformity of the connections between the first and second terminals of the test network and the first and second terminals of the standard network.

9. A device for testing the conformity of the electrical connections between first and second terminals of a test network with the electrical connection between corresponding first and second terminals of a standard network which comprises a first relay connected to a first terminal of the test network, a second relay connected to a corresponding first terminal of the standard network, a source of relay energizing potential, means for connecting the source of potential to a second terminal of the test network and the corresponding second terminal of the standard network to operate the relays, and fault detecting means energized by the operation of only one of the relays for indicating non-conformity of the connections between the first and second terminals of the test network and the connections between the first and second terminals of the standard network.

References Cited in the file of this patent

UNITED STATES PATENTS

| | | |
|---|---|---|
| 2,799,739 | Lowman et al. | July 16, 1957 |
| 2,810,881 | Daily | Oct. 22, 1957 |
| 2,830,264 | Wittmann | Apr. 8, 1958 |
| 2,849,678 | Hannon | Aug. 26, 1958 |
| 2,892,153 | Neill | June 23, 1959 |
| 2,904,750 | Gargani et al. | Sept. 15, 1959 |